(12) United States Patent
Mallya et al.

(10) Patent No.: US 10,522,057 B2
(45) Date of Patent: *Dec. 31, 2019

(54) IN-LINE PRODUCTION OF LINERLESS LABELS

(71) Applicant: FLEX R&D INC., Beverly Hills, CA (US)

(72) Inventors: Prakash Mallya, Sierra Madre, CA (US); David Nicholas Edwards, Pasadena, CA (US)

(73) Assignee: FLEX R&D INC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,480

(22) Filed: May 2, 2019

(65) Prior Publication Data

US 2019/0259307 A1 Aug. 22, 2019

Related U.S. Application Data

(63) Continuation of application No. 16/104,112, filed on Aug. 16, 2018, now Pat. No. 10,325,526, which is a
(Continued)

(51) Int. Cl.
*G09F 3/00* (2006.01)
*B65C 9/00* (2006.01)
(Continued)

(52) U.S. Cl.
CPC ............ *G09F 3/02* (2013.01); *B05D 1/02* (2013.01); *B65C 9/18* (2013.01); *B65C 9/1803* (2013.01); *B65C 9/22* (2013.01); *B65C 9/2204* (2013.01); *B65C 9/46* (2013.01); *C09J 5/00* (2013.01); *C09J 7/20* (2018.01); *G09F 3/10* (2013.01); *B32B 37/12* (2013.01); *B32B 38/0004* (2013.01); *B32B 38/105* (2013.01); *B32B 38/185* (2013.01); *C09J 2201/20* (2013.01); *C09J 2201/606* (2013.01); *C09J 2203/334* (2013.01); *G09F 2003/0229* (2013.01); *G09F 2003/0241* (2013.01);
(Continued)

(58) Field of Classification Search
None
See application file for complete search history.

(56) References Cited

U.S. PATENT DOCUMENTS 4,082,595 A * 4/1978 Slater ...................... B65C 1/025
156/351
4,397,410 A * 8/1983 Schueler ................. B26F 3/002
225/100
(Continued)

*Primary Examiner* — Linda L Gray
(74) *Attorney, Agent, or Firm* — Rajendra Sardesai

(57) ABSTRACT

According to an embodiment of the present disclosure, a method of labeling a plurality of products includes coating a pressure sensitive adhesive to a roll of face stock, the roll of face stock configured to be converted to a plurality of individual labels aligned in a single lane; singulating an individual label from the roll of face stock; and applying the individual label to a product of the plurality of products, wherein the coating, singulating and applying are conducted sequentially in a single continuous operation with a single continuous web of material.

23 Claims, 9 Drawing Sheets

Related U.S. Application Data continuation of application No. 15/687,429, filed on Aug. 25, 2017, now Pat. No. 10,083,635.

(60) Provisional application No. 62/460,873, filed on Feb. 20, 2017.

(51) Int. Cl.

| | | |
|---|---|---|
| *C09J 7/00* | (2018.01) | |
| *B65C 7/00* | (2006.01) | |
| *B05D 1/00* | (2006.01) | |
| *C09J 5/00* | (2006.01) | |
| *B32B 38/00* | (2006.01) | |
| *B32B 37/00* | (2006.01) | |
| *G09F 3/02* | (2006.01) | |
| *B65C 9/46* | (2006.01) | |
| *C09J 7/20* | (2018.01) | |
| *B65C 9/22* | (2006.01) | |
| *B05D 1/02* | (2006.01) | |
| *G09F 3/10* | (2006.01) | |
| *B65C 9/18* | (2006.01) | |
| *B32B 38/18* | (2006.01) | |
| *B32B 37/12* | (2006.01) | |

(52) U.S. Cl.
CPC .... *Y10T 156/1056* (2015.01); *Y10T 156/1057* (2015.01); *Y10T 156/1062* (2015.01); *Y10T 156/1064* (2015.01); *Y10T 156/1082* (2015.01); *Y10T 156/1304* (2015.01)

(56) References Cited

U.S. PATENT DOCUMENTS

| | | | | |
|---|---|---|---|---|
| 5,358,281 | A * | 10/1994 | Greig | G09F 3/0292 101/483 |
| 5,750,192 | A * | 5/1998 | Smith | G09F 3/10 427/208 |
| 6,415,842 | B1 * | 7/2002 | Vasilakes | B65B 51/067 101/474 |
| 6,695,501 | B2 * | 2/2004 | Nedblake, Jr. | B41J 11/0015 101/288 |
| 8,573,276 | B2 * | 11/2013 | Wade | B65C 9/1896 156/521 |
| 10,083,635 | B2 * | 9/2018 | Mallya | G09F 3/02 |
| 10,325,526 | B2 * | 6/2019 | Mallya | G09F 3/02 |
| 2012/0034402 | A1 * | 2/2012 | Henderson | B32B 7/12 428/34.1 |
| 2014/0066539 | A1 * | 3/2014 | Tobing | C09J 153/00 522/46 |

* cited by examiner 101a
101c

101c

IN-LINE PRODUCTION OF LINERLESS LABELS

CROSS-REFERENCE TO RELATED PATENT APPLICATION

This application is a continuation of U.S. patent application Ser. No. 16/104,112 filed in the USPTO Aug. 16, 2018, which is a continuation of U.S. patent application Ser. No. 15/687,429 filed on Aug. 25, 2017 which claims priority to U.S. Provisional Patent Application No. 62/460,873, filed Feb. 20, 2017, the entire content of which is incorporated herein by reference.

FIELD

The following description relates generally to fineness pressure sensitive adhesive labels, and method and system of manufacturing the same.

BACKGROUND

A related art pressure sensitive adhesive (PSA) label slack has a multi-layer laminated structure including four necessary elements: a face or face-slack, an adhesive layer, a release system and a liner. This label slack, which is commonly produced in roll form including multiple individual labels, is converted into individual labels. An end-user may then apply an individual label to a product. The residual liner, coated with the release system, becomes a waste stream. This waste stream is collected on a rewind stand following dispensing (i.e., the application of labels) and may subsequently be land-filled or sold into low value reprocessing.

To reduce the waste generated through the labeling process, the labeling industry has sought to find ways to affect labeling of PSA-type materials without utilizing a liner and the associated release system, thus significantly improving material and supply chain efficiencies, reducing cost and eliminating an increasingly problematic waste stream. Only limited progress has been made to achieving this goal, commonly in the form of so-called "liner-free" labels and "activatable" label.

The liner-free labels are typically manufactured by first printing one side of the face stock with an indicia and then applying a release system to the same side of the printed face stock before coating the reverse side of the face stock with an adhesive to create a self-wound label stock that does not include the liner. While the liner has been eliminated, the release system is still coated on the face-stock, and therefore does not deliver the full cost potential of a true linerless solution.

Activatable labels, on the other hand, involve applying a specialty coating or cover layer to the adhesive system (essentially replacing the liner and the release system) or having an adhesive system which is non-tacky at room temperature. In these solutions a separate process, just prior to labeling, either removes the coating/cover layer to "unmask" the adhesive or activates the adhesives through an external stimulus such as heat or liquid. While the activatable labels do indeed eliminate the liner and the release system, and, therefore, a waste stream, they replace them with another, often relatively expensive material, add complexity and may not improve cost significantly. Both liner-free and activatable label approaches have found limited commercial utility.

There remains a need for a true linerless solution that eliminates both the liner and the release system and does not replace either with another component.

SUMMARY

An aspect according to one or more embodiments of the present invention is directed toward a method of labeling a plurality of products, the labels are free of any liner and any release system and are not replaced with any other material.

Another aspect according to one or more embodiments of the present invention is directed toward a system of labeling a plurality of products, the labels are free of any liner and any release system and are not replaced with any other material.

Additional aspects will be set forth in part in the description which follows, and, in part, will be apparent from the description or may be learned by practice of the presented embodiments.

According to an embodiment of the present disclosure, a method of labeling a plurality of products is provided. The method includes coating a pressure sensitive adhesive to a roll of face stock, the roll of face stock configured to be converted to a plurality of individual labels aligned in a single lane; singulating an individual label from the roll of face stock; and applying the individual label to a product of the plurality of products, wherein the coating, singulating and applying are conducted sequentially in a single continuous operation with a single continuous web of material.

In one embodiment, no winding or rewinding of the roll of face stock is conducted between the coating of the pressure sensitive adhesive, the singulating and the applying of the individual label.

In one embodiment, the method may further include weakening the roll of face stock to enable singulating of individual labels. The weakening of the roll of face stock may be conducted prior to the coating of the pressure sensitive adhesive and including perforating or weakening a borderline of an individual label.

In one embodiment, the weakening of the roll of face stock may be conducted after the coating of the pressure sensitive adhesive and prior to the singulating of the individual label, and including cutting along a borderline of an individual label utilizing a laser, a cutting die, and/or a knife.

In one embodiment, the method may further include printing an indicia on the face stock. The printing may be conducted prior to the coating of the pressure sensitive adhesive at a site different from a site for the coating of the pressure sensitive adhesive.

In one embodiment, the printing may be conducted prior to the coating of the pressure sensitive adhesive at a same site as a site for the coating of the pressure sensitive adhesive and may be conducted sequentially with the coating, singulating and applying.

The roll of face stock may have a first indicia prior to the printing, and the printing may provide a second indicia to the roll of face stock.

The pressure sensitive adhesive may have a coat weight of about 3 gsm to about 20 gsm.

The pressure sensitive adhesive may have a 180° peel of about 1 N/inch to about 20 N/inch.

In one embodiment, the method may further include unwinding the roll of face stock prior to the coating of the pressure sensitive adhesive, wherein a total time needed from unwinding a section of the face stock corresponding to an individual label to a completion of the applying of the individual label to a product is about 60 seconds or less.

In one embodiment, the method may further include curing the pressure sensitive adhesive after the coating of the pressure sensitive adhesive and prior to the singulating of the individual label.

The curing may be through a radiation source with a dosage of about 2 mJ/cm² to about 50 mJ/cm².

The coating may be conducted at a temperature of about 60° C. to about 170° C.

In one embodiment, the applying of the individual label may be about 10 seconds or less after the coating of the pressure sensitive adhesive.

The coating of the pressure sensitive adhesive may be through die coating, screen coating, and/or spray coating.

According to an embodiment of the present disclosure, a system to label a plurality of products is provided. The system includes a coating station to coat a pressure sensitive adhesive to a roll of face stock, the roll of face stock configured to be converted to a plurality of individual labels aligned in a single lane; a singulating station to singulate an individual label from the roll of face stock; and a dispensing station to apply the individual label to a product of the plurality of products, wherein the coating station, the singulating station and dispensing station are located at a same site to provide sequential coating of the pressure sensitive adhesive, singulating of the individual label and applying of the individual label.

In one embodiment, the system may further include a transportation station to move the face stock from an unwinding station to the coating station, the singulating station and the dispensing station sequentially.

The transportation station may include a belt.

In one embodiment, the system may further include a weakening station to create separation between adjacent individual labels.

In one embodiment, the system may further include an accumulation station between the coating station and the singulating station to accumulate the coated face stock when a speed of the face stock at the coating station is faster than a speed of the face stock at the singulating station.

In one embodiment, the system may further include an (intermediate) transportation system and accumulation station between the coating station and the singulating station to accumulate the coated face stock when a speed of the face stock at the coating station is faster than a speed of the face stock at the singulating station.

In one embodiment, the system may further include a printing station to print an indicia on the face stock.

According to an embodiment of the present disclosure, a pressure sensitive adhesive label consists of a face stock; an indicia on the face stock; and a pressure sensitive adhesive on the face stock, wherein the pressure sensitive adhesive has a coat weight of about 3 gsm to about 20 gsm, and a 180° peel of about 1 N/inch to about 20 N/inch.

BRIEF DESCRIPTION OF THE DRAWINGS

These and other features and advantages of the present invention will be better understood by reference to the following detailed description when considered in conjunction with the accompanying drawings. It is understood that selected structures and features have not been shown in certain drawings so as to provide better viewing of the remaining structures and features.

DETAILED DESCRIPTION

Figure 1:
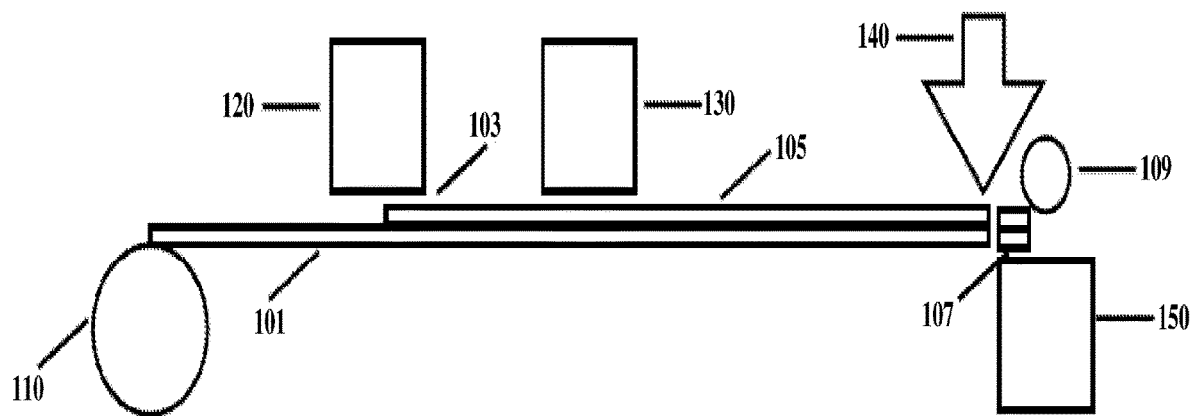
FIG. 1 is a schematic illustration of a method of labeling a plurality of products.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention."

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

According to an embodiment of the present disclosure, a method of labeling a plurality of products is provided. The method includes coating a pressure sensitive adhesive to a roll of face stock, the roll of face stock configured to be converted to a plurality of individual labels aligned in a single lane; singulating an individual label from the roll of face stock; and applying the individual label to a product of the plurality of products, wherein the coating, singulating and applying are conducted sequentially in a single continuous operation with a single continuous web of material. Here, "a single continuous operation" refers to the process where the coating, singulating and applying onto a product is conducted on a given portion of the roll of face stock (i.e., a given portion of the web of material) in the same manufacturing line (e.g., labeling line) sequentially. The roll of face stock is continuously unwound from an unwinding station at the beginning of the manufacturing line, is transported through the coating station and other stations (e.g., a curing station) if applicable and is continuously singulated into individual labels and applied onto the products at the end of the manufacturing line. The process may include variable speed (e.g., different speed at different stations) but should not include winding up the entire roll of face stock and unwinding it again at a different time and/or a different location between the coating station and the singulating and applying stations.

According to an embodiment of the present disclosure, no winding or rewinding of the roll of face stock is conducted between the coating of the pressure sensitive adhesive, the singulating and the applying of the individual label. For example, the coating, singulating and applying may be conducted sequentially and continuously in time in the same process. Here, the adhesive coated face stock with indicia printed thereon forms a label, and the adhesive coated roll of face stock with indicia printed thereon becomes a roll of label stock, which may include a plurality of individual labels.

FIG. 1 is a schematic illustration of a method of labeling a plurality of products. Referring to FIG. 1, a roll of face stock 101 is unwound at a station 110. The face stock 101 passes through a coating station 120 and a layer of pressure sensitive adhesive 103 is coated on the face stock 101. In one embodiment, the face stock 101 passes through a curing station 130 to produce a cured pressure sensitive adhesive 105. In another embodiment, the curing station 130 is not included in the labeling process and the pressure sensitive adhesive is not cured.

The face stock 101 then passes through a singulating station 140 and an individual label 107 at the leading edge of the face stock is singulated (i.e., picked out) of the roll of face stock 101. Next, at the dispensing station 150, the individual label 107 is applied onto a product 109 from a plurality of products. While the singulating and applying of the individual label are described as being conducted respectively at the singulating station 140 and the dispensing station 150, embodiments of the present disclosure are not limited thereto, and the singulating and applying of the individual label may both be conducted at the dispensing station, for example, by a same tool that picks out an individual label and applies that label to a product and/or as part of a single process.

Figure 9:
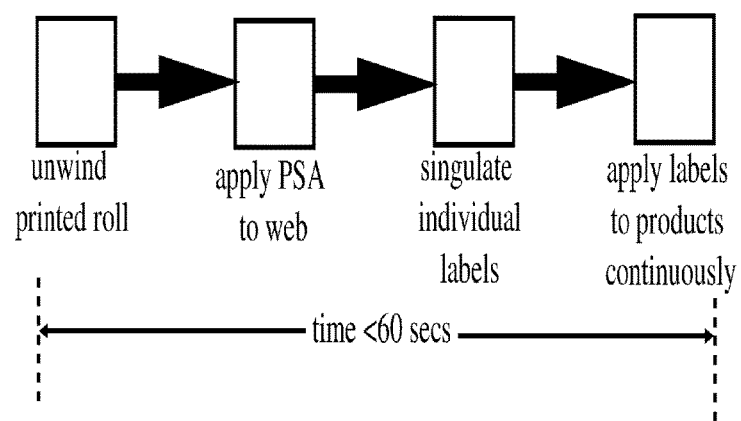
FIG. 9 is a schematic illustration of a labeling process.

As the labeled product 109 is moved away from the dispensing station, a next individual label is applied to a next product, and the process of labeling is conducted continuously. In one embodiment, a time span from the beginning of the coating of the PSA to the completion of the dispensing of the individual label is 60 seconds or less for each individual label. FIG. 9 is a schematic illustration of a labeling process. Referring to FIG. 9, according to an embodiment, it takes less than 60 seconds for an individual label from the roll of face stock (e.g., a printed roll of film or paper) to travel from the unwinding station to the completion of the applying of the label. In another embodiment, it takes less than 30 seconds for an individual label from the roll of face stock (e.g., a printed roll of film or paper) to travel from the unwinding station to the completion of the applying of the label.

The face stock may be made of any suitable material. For example, the face stock may be paper based or film based (e.g., made of clear plastic material, opaque plastic material, foil, metalized paper, metalized film, laminate, etc.). In one embodiment, the face stock may have a thickness of about 20 microns or less, for example, about 10 microns or less, or about 8 microns.

The roll of face stock may be converted to a plurality of, for example, 500, 1000, 2000. 10,000 or more, of individual labels. Accordingly, the roll of face stock may be weakened to create separation between adjacent individual labels. The weakening of the roll of face stock may be conducted prior to the coating of the pressure sensitive adhesive and may include perforating or weakening a borderline of each individual label.

In one embodiment, the weakening of the roll of face stock may be conducted at a site different from the site where the labeling is conducted. For example, the weakening of the roll of face stock may be conducted at a manufacturing site where the roll of face stock is, for example, printed. When the roll of face stock reaches the unwinding station 110, the weakening has already been completed and a perforated line or a weakened line has been created between neighboring individual labels to define each individual label while the labels are still connected to one another. Hereinafter, the term "weakened" refers to the state of the label web (e.g., the roll of face stock) where individual labels can be easily separated from the web yet are still connected to the web.

The weakened line may be the perforated line or a cutting line that cuts through only a portion of the web along the thickness direction. Throughout this description, the terms "web" and "roll" are used interchangeably.

In one embodiment, the weakening of the roll of face stock may be conducted after the coating of the pressure sensitive adhesive and prior to the singulating of the individual label, and may include cutting along a borderline of an individual label utilizing a laser beam, a cutting die, or a knife. While example weakening methods have been described, embodiments of the present disclosure are not limited thereto and any suitable weakening methods may be utilized.

Figure 2:
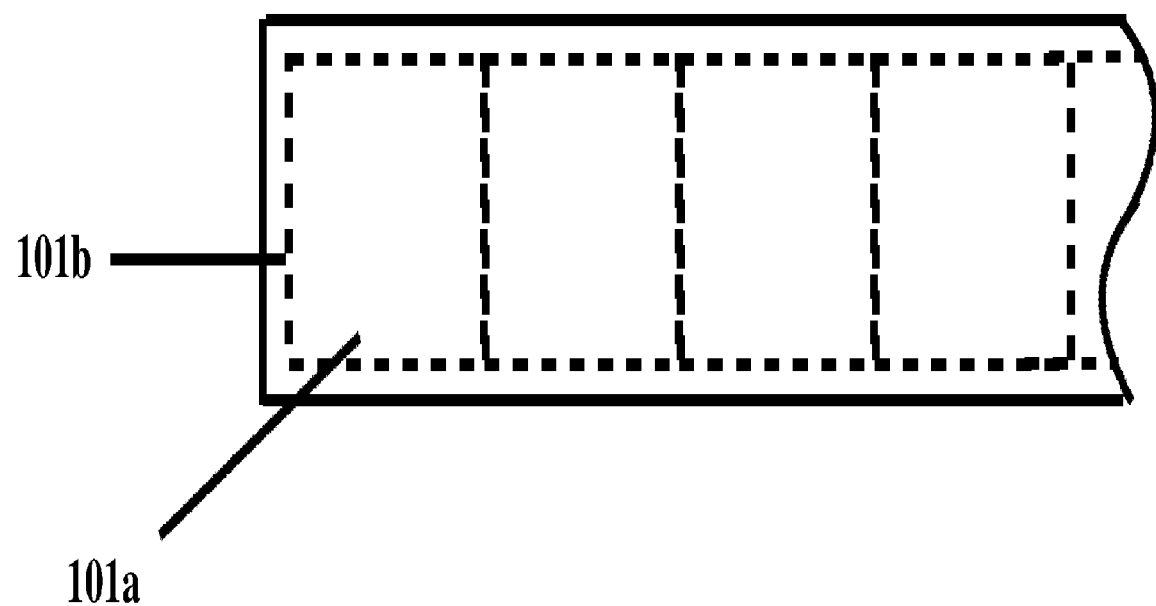
FIG. 2 is a schematic illustration of a section of a roll of face stock.

FIG. 2 is a schematic illustration of a section of a roll of face stock. Referring to FIG. 2, the roll of face stock 101 includes a plurality of individual labels 101a aligned in a single lane. The individual labels may have a perforation line or a weakened line 101b around it's circumference, but embodiments of the present disclosure are not limited thereto, and the roll of face stock may not include the perforation line or weakened line 101b.

The face stock 101 may include an indicia printed on a surface thereof. In one embodiment, the printing may be conducted prior to the coating of the pressure sensitive adhesive at a site different from the site for the coating of the pressure sensitive adhesive. The printing process may not be part of same continuous labeling process described in association with FIG. 1.

The printing may be conducted at a label manufacturing site where the label face stock is printed and wound into the roll. The indicia may describe and advertise for the product to be labeled. For example, the indicia may be the product name, information about the product, a logo associated with the product, etc. This printing may be conducted on a continuous (roll-to-roll) press producing many labels across and down the web of the label stock. The web of the label stock may be slit into single lane labels prior to the labeling process described in association with FIG. 1.

Figure 3:
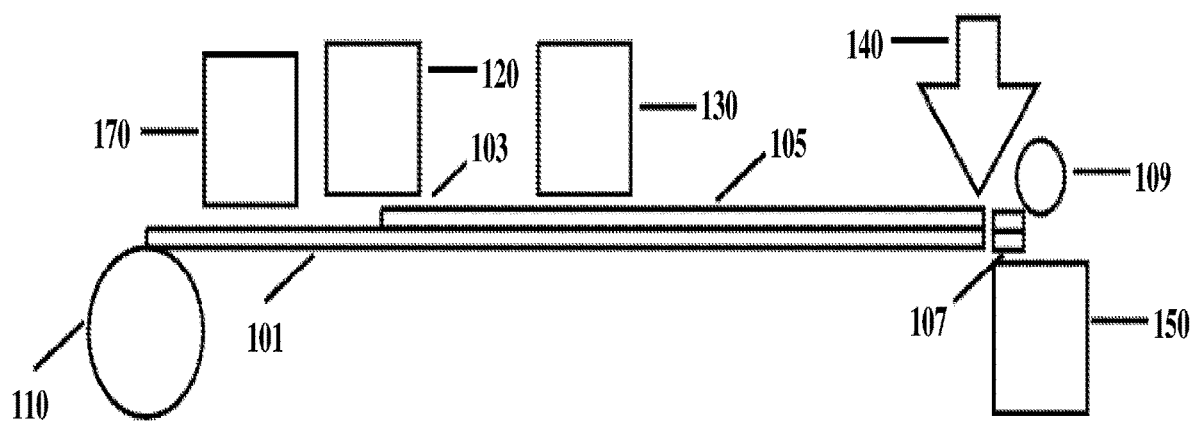
FIG. 3 is a schematic illustration of a process of labeling a plurality of products according to an embodiment of the present disclosure.

In one embodiment, the printing may be conducted prior to the coating of the pressure sensitive adhesive at the same site as the site for the coating of the pressure sensitive adhesive and may be conducted in the same process, e.g., sequentially and/or continuously in time, with the coating, singulating and applying. FIG. 3 is a schematic illustration of a process of labeling a plurality of products according to an embodiment of the present disclosure. In FIG. 3, the same reference numerals are utilized as in FIG. 1 to indicate similar process and materials, and the description thereof is not repeated again.

Referring to FIG. 3, a roll of face stock 101 including a plurality of labels 101a is unwound at the unwinding station 110. The face stock 101 passes through a printing station 170 first and a second indicia is printed on the face stock 101. Here, the roll of face stock 101 may have a first indicia printed at the manufacturing site, and the second indicia may add, for example, customized information to the labels 101a. In one embodiment, the roll of face stock 101 may not include the first indicia and the entire printing is conducted in-line at the printing station 170. The printing may be on either side of the face stock or on both sides (with the use of two printing stations).

The pressure sensitive adhesives may be either a hot melt PSA or a warm melt PSA. Any suitable pressure sensitive adhesive formulation that satisfies the following conditions may be utilized: forms a clear pressure sensitive adhesive layer, flows well to form a high quality coating (e.g., uniform coating without significant defects) at low coat weights, can be coated at temperatures ranging from about 60° C. to 170° C., and requires limited or no post-coating processing. For the purpose of the current description, the term "hot melt adhesive" or "hot melt pressure sensitive adhesive" refers to a pressure sensitive material that flows and is coatable to give a high quality coating at temperatures of about 110° C. and above. The term "warm melts" or "warm melt pressure sensitive adhesive" refers to a pressure sensitive material that flows and is coatable to provide a high quality coating at temperatures from about 60° C. to about 110° C. The coating may be conducted at a temperature of about 60° C. to about 170° C.

Suitable pressure sensitive adhesives may be based on acrylic polymers, rubber based polymers such as block, tapered or random copolymers of styrene, butadiene, isoprene, or ethylene butylene, polyurethanes, silicone polymers or hybrids (graft or block or random copolymers of the above polymers), or combinations or blends of the above mentioned polymers with or without further additives. These polymers or copolymers can be random, block, or graft copolymers.

The polymers may be further modified with a wide range of additives. Non-limiting example additives include tackifiers, plasticizers, fillers, crosslinkers, viscosity modifiers, etc., which are either commercially available or custom synthesized. The additives may have very low vapor pressure at the coating temperature and may not emit ingredients that are harmful or odorous. Other suitable additives that may be utilized are those to enhance adhesion to wet bottles, or those that enhance adhesion under wet conditions.

The glass transition temperature (Tg) of the suitable pressure sensitive adhesives is typically about 20 to 25° C. below the usage/application temperature. For example, for room temperature applications, the PSA may have a Tg of lower than about 0° C.

Suitable pressure sensitive adhesives may be readily coated utilizing die coating, screen coating, spraying or other suitable coating technologies at temperatures which do not distort or affect the aesthetics of the face stock material upon which they are coated. The viscosities of the adhesive at the coating temperature should be suitable for forming a high quality coating on the web. For example, the viscosity of the adhesive may range from about 100 centipoise to about 15,000 centipoise or even higher at the coating temperature.

The molecular weight of the polymers may be any suitable value as long as once formulated with the additives, the viscosity of the adhesive composition falls in the range of interest to form a high quality coating at the coating temperature. For example, the weight average molecular weight may be about 20,000 Daltons to about 300,000 Daltons.

When a filmic face stock (e.g., face stock made of a polymer material) is utilized for the labels, it is typically sensitive to high temperatures. For such face stocks, a ultraviolet (UV) curable warm melt adhesive or a warm melt adhesive that does not require any curing may be utilized. The warm melt adhesive may be applied to the filmic web (i.e., filmic face stock web) at relatively lower temperatures (e.g., below about 130° C.) without distorting the web.

The coating temperature may be further lowered by dissolving the hot melt adhesive or warm melt adhesive in a low vapor pressure, high boiling point, benign co-monomer or low molecular weight polymer additive to make a syrup, coating the syrup on the web and curing it. The usage of a syrup further enhances the coating quality and also allows the usage of more heat sensitive filmic label face stocks such as polyethylene (PE).

The UV curable adhesive system (adhesive formulation), for example, may be based on either acrylic or rubber based chemistries. Non-limiting examples of suitable UV curable adhesives include those from suppliers such as BASF, Henkel, or others. The hot melt adhesives may be readily and robustly coated at low coat weights. In one embodiment, the coat weight is in the range of about 3 gsm to about 20 gsm, or in the range of about 3 gsm to about 12 gsm, depending on the face stock. The adhesive may be coated utilizing any suitable coating technology.

In one embodiment, a hot melt adhesive is metered via a pump from a standard tank to a small slot die coater. The slot die coater can be obtained from any of a number of companies such as Acumeter, ITW, Nordson, etc. A slot die with a smoothing rod will ensure a high quality coating at the low coat weights. At the coating head the adhesive is applied to the reverse side of the printed and weakened face material (i.e., the adhesive is applied to a side opposite to the side where the indicia is printed on the face material) which is fed continuously into the die. The coating width may be easily adjusted utilizing shims on the die to match the width of the face stock web.

In one embodiment, the method may further include curing the pressure sensitive adhesive after the coating of the pressure sensitive adhesive and prior to the singulating of the individual label. The curing may be through a radiation source with a dosage of about 2 mJ/cm$^2$ to about 50 mJ/cm$^2$.

For example, after the hot or warm melt adhesive is applied to the label face stock, the face stock exits the die. Optionally, the adhesive is exposed to a short burst of UV radiation at a curing station (for example, at a dosage ranging from about 5 mJ/cm$^2$ to about 50 mJ/cm$^2$) which partially cures the adhesive and readies it to be applied directly to products at the singulating station.

In one embodiment, the post-coating unit (e.g., at the curing station) is compact and robust. A curing unit from a company such as Nordson, Dymax, Fusion etc., may be utilized for the curing. The radiation needed to cure may depend on the adhesive utilized and typically low dosages are adequate for these labels. For example, a lamp (such as a D bulb from Fusion) with an output of 500 watt/in or less may be utilized to effect the cure at a high speed and a short time.

The type of lamp utilized determines the wavelength of the radiation and may be selected according to the adhesive utilized. For example, the BASF AC 250 adhesive with the low coat weight described above may be cured utilizing a lamp with a UV-C radiation at a wavelength of 250 nm to 290 nm and at dosage of about 2 to 50 mJ/cm$^2$. Lamps in a unit that is 6" wide and 8" long have been utilized after the web exits the die. The adhesive passes under the lamps and is exposed to a continuous burst of UV for a short period of time.

For clear filmic label face stock materials utilized for clear-on-clear applications, where the appearance of the final label on the product requires the adhesive to be uniform, clear and defect free, utilizing a continuous coating of a UV curable hot melt or warm melt adhesive has been found to be effective.

For paper based labels and opaque filmic labels, where the adhesive cannot be seen after the label is applied onto the product, the coating methods may be selected to further provide cost advantages. In one embodiment, the hot melt adhesive is sprayed onto the printed web utilizing standard hot melt spray nozzles. Coating the adhesive by the spraying method may reduce the total amount of adhesive required, as it is not a continuous covering and it also does not require the contact of the coating system with the web (therefore reducing the web tension required to pull the web through the coating system to the singulating station). After spraying, the adhesive may be cured by UV radiation, if needed, as it passes under the lamps in the curing unit. The spraying can be done using a system such as a Universal Spray Nozzle system by Nordson.

Figure 4:
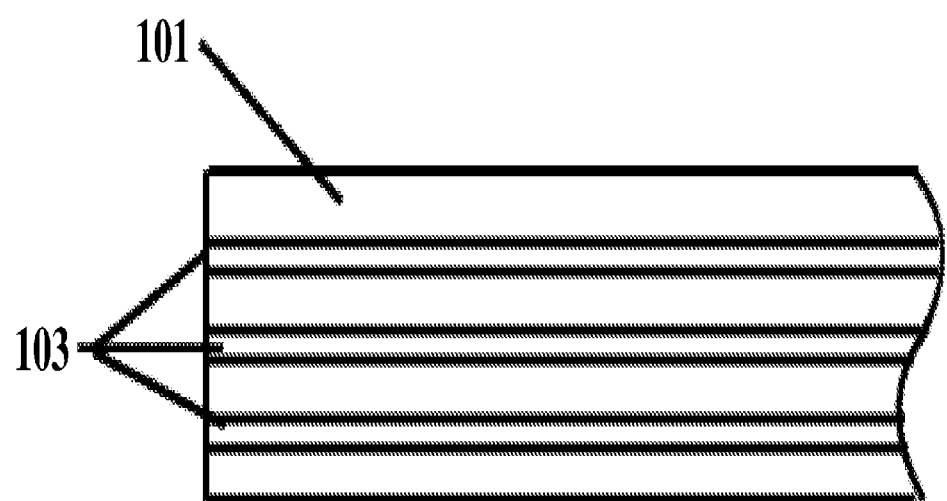
FIG. 4 is a schematic illustration of a face stock with adhesive coated in lanes.

In another embodiment, a standard die is deckled so as to coat the hot melt adhesive in lanes. This provides for a discontinuous coating and thereby reduces the amount of adhesive utilized. FIG. 4 is a schematic illustration of a face stock with adhesive coated in lanes. Referring to FIG. 4, adhesive 103 is coated on the face stock 101 in the shape of strips with each strip spaced apart from neighboring strips.

In another embodiment, the adhesive may be printed (e.g., with a discontinuous pattern) on to the web utilizing, for example, a Stork screen printer.

The pressure sensitive adhesives according to embodiments of the present disclosure are chosen to meet the Dahlquist criteria, and more details on the types of PSA materials that can be utilized can be found in a wide range of patents and publications, one such being the Handbook of Pressure Sensitive Adhesive Technology, Second Edition, Ed. Donatas Satas, van Nostrand Reinhold, N.Y., 1989, the entire content of which is incorporated herein by reference.

The pressure sensitive adhesive may have a 180° peel on a glass panel of about 1 N/inch to about 20 N/inch, for example, of about 5 N/inch to about 17 N/inch.

In one embodiment, no curing or drying is conducted after the coating of the adhesive, i.e., the adhesive coated on the label face stock does not require any curing or drying.

After the label face stock has been adhesive coated and optionally cured, it may be pulled through to the singulating station 140. At the singulating station 140, labels are removed from the web, singulated, and applied continuously to products that are presented to the dispensing station for continuous application to products. Singulation may occur by effectively tearing the label from a pre-weakened web or via die cutting utilizing, for example, a knife or die cutting tool.

The web may be pulled through to the singulating station (from the starting unwinding station 110 and through the coating station 120) utilizing, for example, a low surface energy belt (which contacts the adhesive side of the web), a friction belt (which contacts the printed side of the web) or a winder (which collects any matrix remaining after the labels have been removed from the web).

Figure 5A:
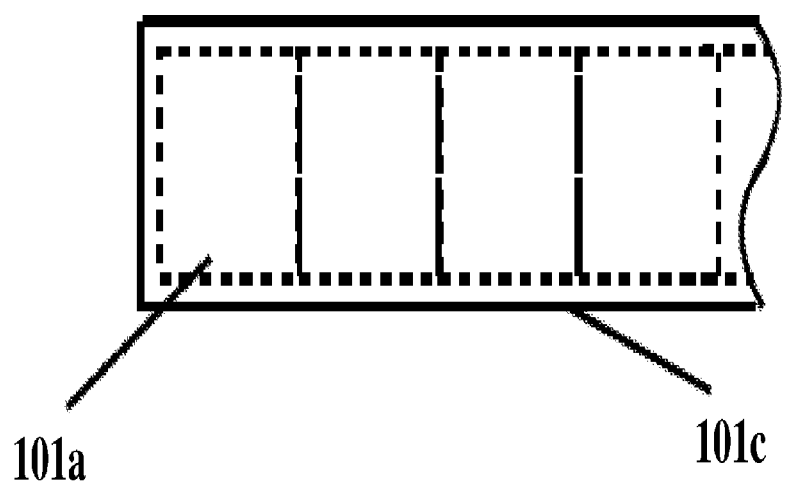
FIGS. 5A and 5B are schematic illustrations of a label face stock with a matrix.
Figure 5B:
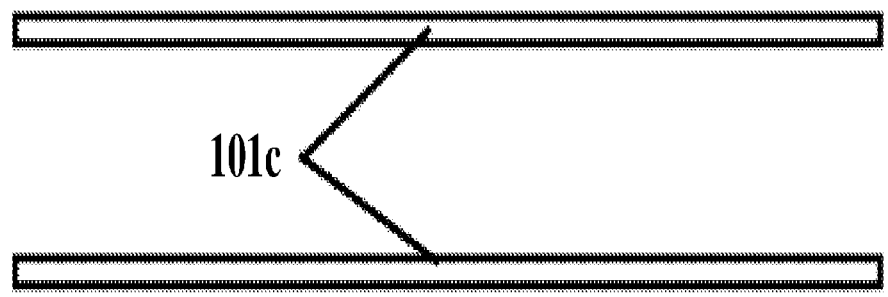

When a winder is utilized to pull the web, leaving a small (e.g., about ⅛") lane on either side of the labels may provide a sufficient matrix to allow a rewind station to pull the label stock through the entire process. FIGS. 5A and 5B are schematic illustrations of a label face stock with a matrix. Referring to FIG. 5A, a label face stock 101 includes the labels 101a and a matrix 101c at both sides of the labels 101a. The matrix 101c may have a width (from the edge of the label 101a to the corresponding edge of the face stock 101) of about 1/10" to about ½" (and could vary in width for labels which do not have square corners). Referring to FIG. 5B, after the label 101a has been picked out of the web and applied to the product, only the matrix 101c remains and it is rewound at the rewind station.

The usage of a winder after the dispensing station, which is common in related art labeling process (for collecting the matrix and pulling the label stock through the dispensing system) may be suitable for applying labels which are not rectangular or square shaped. For the irregularly shaped labels, there is often material left in the web (described here as the matrix) after singulation of the labels and this matrix can be readily collected on a winder. The winder may be utilized in conjunction with the belt or without the belt.

Figure 6:
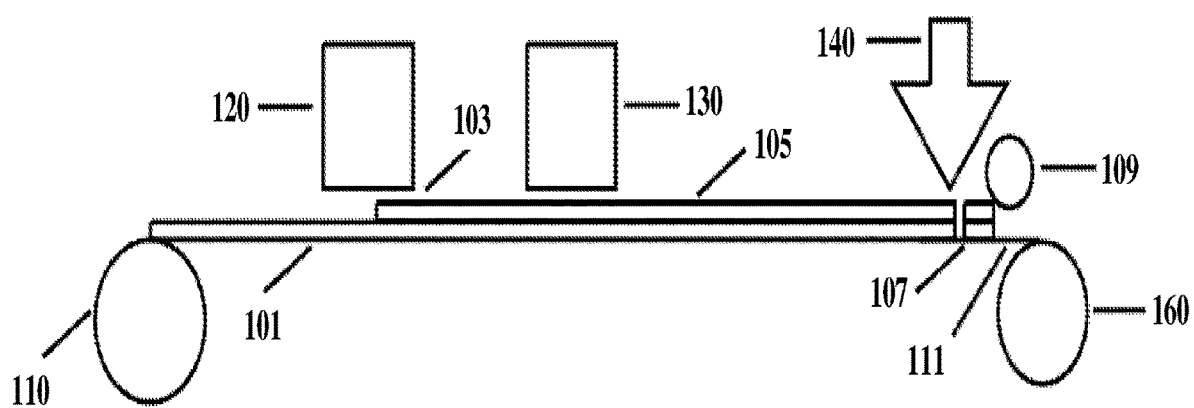
FIG. 6 is a schematic illustration of a labeling process according to an embodiment of the present disclosure.

FIG. 6 is a schematic illustration of a labeling process according to an embodiment of the present disclosure. In FIG. 6, the same reference numerals are utilized as in FIG. 1 to indicate similar process and materials, and the description thereof is not repeated again.

Referring to FIG. 6, a roll of face stock 101 including a plurality of labels 101a is unwound at unwinding station 110. The face stock 101 passes through a coating station 120 and an adhesive layer 103 is coated on the face stock 101. The adhesive may be optionally cured. The web may be optionally rotated 90° and reaches the singulating station 140. After the individual label 107 is singulated (i.e., picked out of the web) and applied onto the product 109, the left over matrix 111 is wound up at the winding station 160.

In one embodiment, the applying of the individual label may be about 10 seconds or less, for example, about 6 seconds or less, after the coating of the pressure sensitive adhesive. In one embodiment, the labeling process may be conducted at a rate of about 50 labels/min to about 1000 labels/min.

According to an embodiment of the present disclosure, a system for labeling a plurality of products is provided. The system includes a coating station to coat a pressure sensitive adhesive to a roll of face stock, the face stock including a plurality of individual labels aligned in a single lane; a singulating station to singulate an individual label from the roll of face stock; and a dispensing station to apply the individual label to a product of the plurality of products, wherein the coating station, the singulating station and dispensing station are located at a same site to provide continuous coating of the pressure sensitive adhesive, singulating of the individual label and applying of the individual label.

In one embodiment, the system may further include a transportation station for moving the face stock from an unwinding station to the coating station, the singulating station and the dispensing station sequentially. The transportation station may include a belt, e.g., a conveyer belt.

When singulation is enabled by cutting the individual labels in-line at the singulating station (or dispensing station if no separate singulating station is utilized), the web speed may vary at the point of dispensing. For example, the web may slow down or briefly stop to complete the cutting. This will lead a different web speed at the singulating station and at the coating station. To reduce or eliminate any coating defects that the web speed variation may cause, an accumulator may be utilized after the coating station, which may provide a method of maintaining a constant web speed through the coating station whilst removing slackness in the web caused by the web speed variations downstream. In another embodiment, a driven roller (or belt) may be included between the coating station and the accumulator, which may ensure that the web speed remains constant through the coating station. Similarly in some embodiments, the application of the singulated label to product may require a variable speed and again an accumulator may be utilized to ensure that the web speed at the coating station is constant.

In one embodiment, the system may further include an accumulation station between the coating station and the singulating station to accumulate the face stock when the speed of the face stock at the coating station is faster than the speed of the face stock at the singulating station.

For example, the system may include two transportation stations. A first station (e.g., a belt driven by a first roller) to move the face stock through the coating station at a first constant speed, and then a second station (or system) (e.g., a belt driven by a second roller) which moves the coated face stock through the singulating and dispensing stations at a second constant speed or a variable speed. The first and second constant speeds may be of different values at any moment in time (although the time-averaged speeds will be the same). The two transportation stations provide for a continuous web speed through the coating station and allow for a variable web speed through the singulating and dispensing stations. The accumulation could also be conducted in the form of a larger roll or a belt onto which the singulated labels are dispensed and further decoration of the objects can be done from this dispensing accumulation roll. This enables the coating to be done in a continuous manner.

In one embodiment, the system may further include a weakening station to create separation between adjacent individual labels. In one embodiment, the system may further include a printing station for printing an indicia on the face stock.

The labeling system according to embodiments of the present disclosure enables the elimination of both the liner and the release layer, and does not replace either with another component. It thereby delivers on the true cost and environmental promise of a linerless solution. There is additional complexity at the point of dispensing but this complexity is readily justified by the substantial savings, environmental benefits, and supply chain efficiencies offered by the invention. Further, according to an embodiment of the present disclosure, the face stock may have a thickness of about 20 microns or less. In related art labeling process, the usage of face materials below 25 microns is rare because die-cutting only the face stock and the adhesive layers over the release system and the liner becomes difficult at low thickness without damaging the liner and thereby the integrity of the total roll. The adhesive coat weight may be about 3 gsm to about 20 gsm, for example, less than 10 gsm, which is much lower than that used in a related art label and related art labeling system (which is typically greater than 15 gsm).

According to an embodiment of the present disclosure, an example label manufacturing process begins at the label manufacturing site, where a roll of face stock material (paper or film) is first printed, as is done today with related art labeling, with information and advertising that will be placed on the products to be labeled. During the same process, but after the printing, the face stock is perforated or weakened, utilizing, for example, a rotating die, to create a roll of printed material with individual labels defined by weakened areas at the extremities of each label. The roll of printed face stock, which carries the 'weakened' labels, is then slit to provide a single lane of labels. The printing and the slitting processes are substantially the same as the corresponding related art ones, except that the label face stocks are only weakened and not die cut through the entire label face stock.

The slit roll is then shipped off the manufacturing site and provided to the end user at the labeling site. In the subsequent labeling process, the roll is fed into a coating station which applies a thin (3 gsm to 15 gsm) coating of a hot melt or a warm melt PSA (which could optionally be UV curable) to the face stock material. If it is a UV curable adhesive, it may be rapidly and partially (or completely) cured by a low dose of UV as it exits the coating station and is then fed directly to the singulating station. However, with choice of the right hot melt or warm melt adhesive (with the desired adhesion performance), no curing is necessary. In one embodiment, after the coating of the adhesive, no drying is needed. The adhesive coated face stock is directly passed on to the singulating station without any drying process. In another embodiment, after the coating of the adhesive, no drying and no curing are conducted. The adhesive coated face stock is directly passed on to the singulating station without any drying or curing process.

At the singulating station and the dispensing station (or a combined dispensing station without a separate singulating station), the labels are singulated by breaking the lines of weakness, which were created during the printing process at the manufacturing site, and are then applied to products in a continuous fashion.

While specific process steps are described in association with the example process above, embodiments of the present disclosure are not limited thereto. For example, the face stock material may not be perforated at the manufacturing site, an adhesive other than UV curable hot melt or warm melt adhesives may be utilized, other suitable energy-activated, rapidly curable adhesives or non-curable adhesives may be utilized, and/or part or all of the printing may be done during the labeling process. While a label face stock with a plurality of individual labels aligned in a single lane has been described, embodiments of the present disclosure are not limited thereto. For example, the face stock may include multiple lanes of labels, e.g., 2 lanes of labels. At the singulating station, each lane of labels may be singulated by a separate tool and applied to a separate line of products (e.g., each line of products is transported by a separate conveying system), or a single tool may be utilized to singulate the multiple lane of labels and apply them to the same line of products (e.g, all of the products are transported by the same conveying system).

According to embodiments of the present disclosure, the labels are coated with the adhesive as part of the same process in which they are dispensed and applied to products. This process is continuous and can be readily incorporated into the existing (related art) dispensing schemes. In principle any adhesive that (a) can be coated at temperatures from about 60 to 170° C. and (b) requires either no further conditioning or very small amounts of energy curing, can be utilized. These adhesives may be thermoplastic elastomer based or acrylic based adhesives or blends or hybrids of the two requiring no curing or self-curing, or which can be cured utilizing an external energy source such as UV. The coating temperature range may be wider but is limited by the ability of the coated substrate to withstand the temperature without distortion.

In one embodiment, adhesives that require energy activation to cure but may be cured with very little energy to provide suitable adhesion performance at very low coat weight may be utilized. In one embodiment, adhesives, which are formulated without any photo-initiators, thus lowering the cost, and are not cured after the coating, perform well in a range of applications.

According to an embodiment of the present disclosure, the adhesive is applied, or the coating is applied which becomes an adhesive, in the same continuous process, with a continuous web of label stock, in which the label is dispensed and applied to a substrate. Thus, at the labeling process (e.g., the point of dispensing), the label material (typically printed) is unwound, moved through the coating head, cured if needed (or activated), by a simple UV system, and then advanced to the singulating station where the web is separated into single labels (singulated), which are then applied to the product. A key requirement in this process is that, following the coating, the adhesive must be ready for usage in a short period of time (for example, in less than 10 seconds, or in less than 3 seconds) and requires little or no processing (curing) during this time so that the process remains compact and inexpensive to operate.

In one embodiment, an adhesive of a relatively low molecular weight may be selected, allowing it to be uniformly coated at a low coat weight. The adhesive may not require any curing, and can be utilized as a label adhesive immediately. Unlike related art PSA labels, the adhesive coated roll is not wound up (as the coated web is utilized immediately). Therefore, in the labeling process according to embodiments of the present disclosure, there are no issues associated with the related art label rolls where the adhesive has to be of sufficiently high molecular weight to resist the forces that the adhesive layer experiences in the roll form which causes it to flow and leads to edge ooze and blocking. To achieve the required molecular weights, related art processing demands significant curing. In the process according to embodiments of the present disclosure, little or no curing is required. In one embodiment, the labels have been perforated so singulation occurs by effectively tearing the perforations at the dispensing point. However, singulation may occur by utilizing a variety of cutting methods at the dispensing point such as a laser or a flying knife (both with and without pre-perforations). Another label singulating method is to die cut or laser cut labels against a moving vacuum anvil (commonly a drum) which, after cutting, carries labels to the application point.

According to an embodiment of the present disclosure, an example label manufacturing process to provide a clear filmic label on a product may begin at the manufacturing site by the printing of a roll of face stock material (paper or film), as is done today with related art labeling, with information and advertising that will be placed on the products to be labeled. During the same process (on the same site), but after the printing, each label is weakened around its periphery by perforating with a rotating die. The roll of printed material, which carries the weakened labels, is then slit to provides a single lane of labels. This slit roll is then shipped off the manufacturing site and provided to the end user to be utilized at the client's site (i.e., the labeling site).

Figure 7:
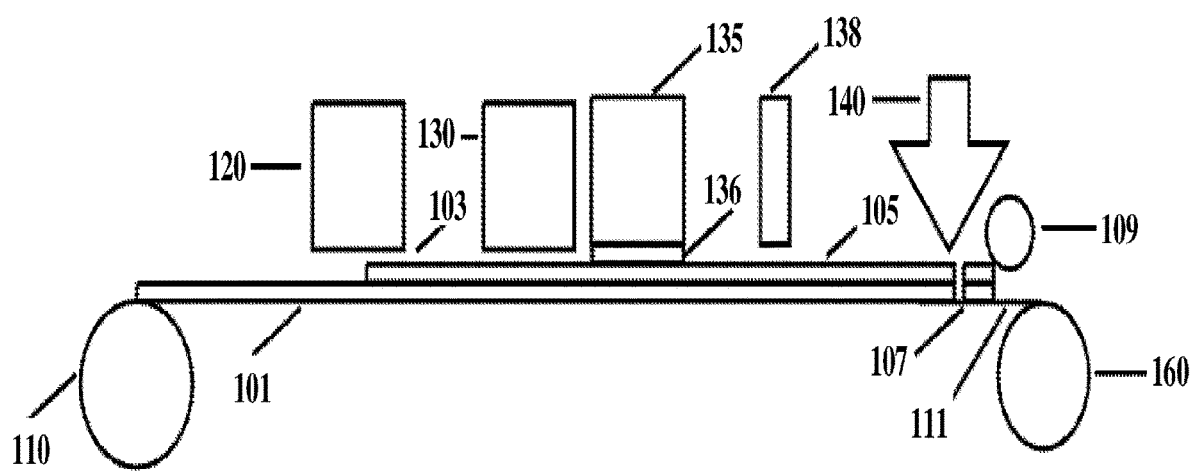
FIG. 7 is a schematic illustration of an example labeling process at the client's site.

FIG. 7 is a schematic illustration of another labelling process according to an embodiment of the present disclosure. In FIG. 7, the same reference numerals are utilized as in FIG. 1 to indicate similar process and materials, and the description thereof is not repeated again. Referring to FIG. 7, a roll of face stock 101 including a plurality of labels 101*a* is unwound at unwinding station 110. The face stock 101 passes through a coating station 120 and an adhesive layer 103 is coated on the face stock 101. The adhesive may be optionally cured at the curing station 130. The web is pulled through the coating station 120 by a driven roll or belt 136 at a transportation station 135 at a constant speed. Where a belt 136 is utilized, the belt has a low surface energy and is in contact with the adhesive. The web then passes through an accumulator 138 which takes up any slack in the web resulting perturbations in the web speed downstream in the singluating and dispensing stations. The web may be optionally rotated 90° and reaches the singluating station 140. After the individual label 107 is singulated (i.e., picked out of the web) and applied onto the product 109, any left over matrix 111 is wound up at the winding station 160. In other embodiments the belt 136 may be a friction belt which contacts the face stock 101.

While die coating and a continuous coating layer have been described in the example process described above, embodiments of the present disclosure are not limited thereto. For example, spraying or screen printing of the adhesive may be utilized, instead of the continuous coating, for applications where the final appearance of the adhesive is not important. In another embodiment, the adhesive may be pattern coated, utilizing a suitable coating die, for applications where the final appearance of the adhesive is not important. In both of these cases the amount of adhesive required to produce a finished label is reduced. For example, the adhesive may cover about 30% to about 90% of the surface area of the label. Singluation may be affected by removing a label from a pre-weakened web but can also be affected by cutting with a laser, a knife or a die. It should also be noted that where one or more transportation stations (transportation systems) are utilized immediately after the coating station, the transportation system (e.g., the belt) may be in contact with the web from either the adhesive side or from the non-coated side opposite to the adhesive side.

According to another embodiment, a printed and slit roll of face stock material provided to an end user is coated with an adhesive, cut or perforated in order to enable the singulation (separation of a single label from the web) and applied to the products to be labeled in a continuous fashion. The web may be perforated before the adhesive coating and followed by adhesive coating, singulating and applying. During the singulating act, which may be conducted with a cutting die or a laser beam, the corners of the labels may be rounded to enhance the aesthetics of the label. When the web speed at either the singulation or application station is variable (i.e., the web is changing speed at different stations) then an accumulator located after the coating station may be utilized to smooth out any variations in web speed arising from the either the singulating or application act, so as to ensure that the coating speed is constant.

An indicia printing station in line on the web after unwinding and prior to the adhesive coating may be included in the labeling process. In early deployments, an end user may want the ability, for example, to add some simple variable printing, such as a name or customized indicia, to each label in addition to the earlier printing performed at the manufacturing site.

In one embodiment, the whole label may be printed in line with the coating and singulating stations. This would allow the end-user to create labels from a starting web of material, either from a perforated roll with weakened areas around the label area, or, where die cutting is done fully at the singulating station, from a simple (e.g., blank) roll of film or paper. Printing fully in line may allow the end-user to fully customize every label and eliminate expensive inventory.

Figure 8:
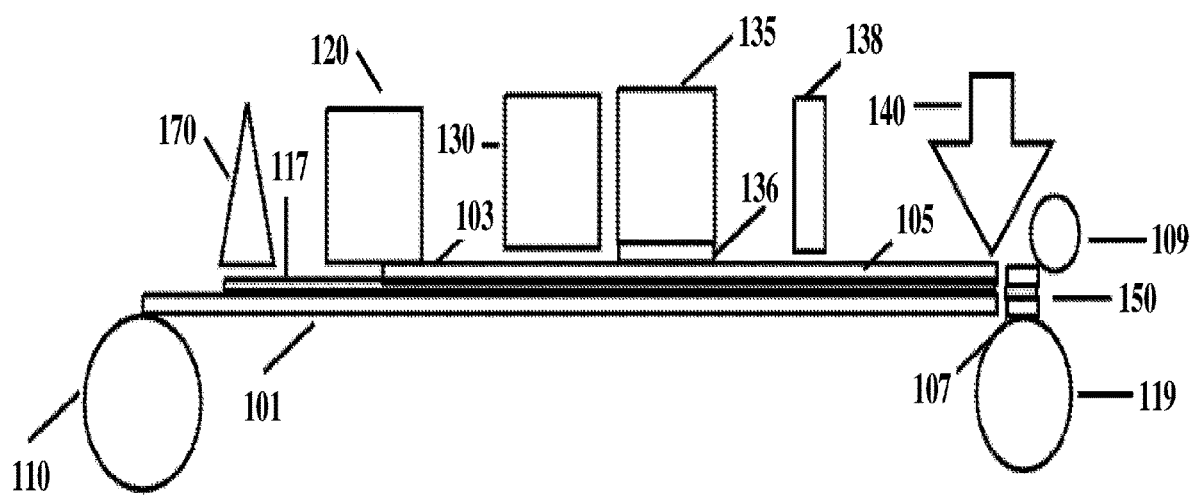
FIG. 8 is a schematic illustration of a process including the inline printing.

FIG. 8 is a schematic illustration of a process including the inline printing. Referring to FIG. 8, a roll of blank (i.e., non-printed) face stock 101 without any indicia printed thereon is unwound at the unwinding station 110, and pulled to a printing station 170 by the transportation system 135. At the printing station 170, an ink layer 117, representing an indicia, such as the information about the product and graphical presentation, is printed on the face stock 101, utilizing, for example, a high speed digital printer. The printed face stock is then moved to the coating station 120, and optional curing station 130. The printed and coated web then advances to the singulating station 140, via an accumulator 138, before an individual label 107 is applied to the product 109. In one embodiment, the labeling process may further include a rotating anvil 119 where individual labels are cut out of the web utilizing a cutting die.

While the printing station 170 is illustrated in a process including a curing station 130 and a rotating anvil 119, embodiments of the present disclosure are not limited thereto, and various suitable combinations of the process stations may be utilized and some of the process stations may not be included, such as the curing station 130 and/or the rotating anvil 119. Further, while the ink layer 117 and the adhesive layer 103 have been shown to be on the same side of the face stock 101, embodiments of the present disclosure are not limited thereto, and the ink layer 117 and the adhesive layer 103 may be positioned on opposite sides of the face stock 101. For example, the ink layer 117 may be applied to the top surface of the face stock 101, and the adhesive layer 103 may be applied to the bottom surface of the face stock 101.

Figure 10:
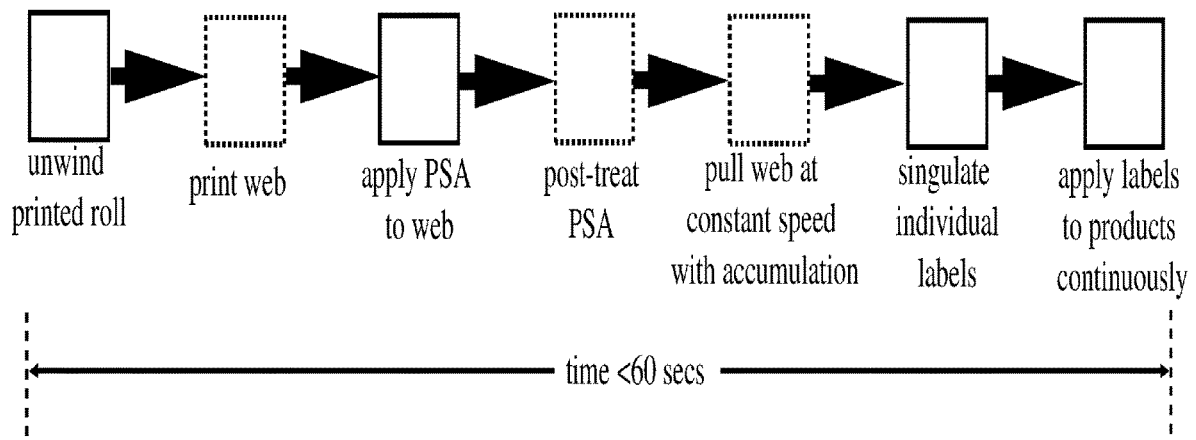
FIG. 10 is a schematic illustration of a labeling process.

FIG. 10 is a schematic illustration of a labeling process. Referring to FIG. 10, according to an embodiment, it takes less than 60 seconds for an individual label from the roll of face stock (e.g., a printed or unprinted roll of film or paper) to travel through the unwinding station, the printing station (optional, may or may not be included), the coating station, the curing station (optional, may or may not be included), the accumulation station (optional, may or may not be included), the singulating station, and to the completion of the applying of the label. In another embodiment, it takes less than 30 seconds for an individual label from the roll of face stock (e.g., a printed or unprinted roll of film or paper) to travel through the unwinding station to the completion of the applying of the label.

In a related art labeling process, a label includes a face stock, an adhesive layer under the face stock, a release system in contact with the adhesive, and a liner under the release system. The face stock is printed with an indicia (commonly describing and advertising the product to be labeled). This printing is typically done on a continuous (roll-to-roll) press producing many labels across and down the web of the label stock. The upper parts (face stock and adhesive layer) of the label-stock are then die-cut, to produce individual labels, which are still carried in roll form and supported by the liner. Typically, but not necessarily, the die-cutting is performed on the same asset as that utilized to print the labels.

The printed die-cut label stock is then slit to provide a single lane of labels and these slit rolls are then sent to an end-user who will put the labels onto products via a dispensing process. Labeling occurs at the end-user by feeding the die-cut label stock to a dispensing machine wherein labels are removed one-at-a-time from the liner and applied to the products to be labeled. The release system allows the adhesive-backed labels to be removed easily from the liner. This is typically a continuous operation running at high speeds (30-600+ labels/min) in which the to-be-labeled products are presented continuously to the dispensing point where they are labeled.

The residual liner, coated with the release system, becomes a waste stream. This waste stream is collected on a rewind stand following dispensing and may subsequently be land-filled or sold into low value reprocessing.

The above related art process has existed for more than 50 years, and whilst there has been continuous effort to improve this process (with, for example, the attempt to utilize thinner face and thinner liner materials, and lower coat weights for the adhesive and release system, etc.) the basic construction has remained unchanged. Over this time frame, the industry has developed enormous scale with the adhesive coated often onto a wide web (often 2-3 meters in width) of release coated liner (film or paper) at very high speeds (often well in excess of 1000 m/min). The adhesive, coated on this release coated liner, is laminated to the face (film or paper) web in the same process, forming the label stock. Most labels are manufactured this way through what is commonly known as the transfer coating process. The adhesive can be also directly coated on to the face material, followed by laminating with the release coated liner, commonly known as the direct coating process. For most of this time, the industry has sought to find ways to affect labeling of PSA-type materials without utilizing a liner and the associated release system, thus significantly improving material and supply chain efficiencies, reducing cost and eliminating an increasingly problematic waste stream.

Typically, approaches to linerless solutions have fallen into one of two broad categories: "Liner-free Labels" and "Activatable Labels".

Liner-free Labels, while eliminating the liner, retain the release system, and thus do not deliver the full cost potential of a true linerless solution. This approach typically begins with the printing of the face stock and then applying a release system to the printed face stock before coating the reverse side with an adhesive to create a self-wound label stock that does not have the liner. Typically the self-wound stock is produced on a narrow web press utilizing an expensive adhesive, often a UV-cured hot melt, at a speed considerably lower (<<1000 m/min) than that utilized in related art adhesive coating. The cost accumulation of lower scale, higher cost adhesive and the continued usage of a release system mean that a portion, and sometimes all, of the cost benefit relative to the traditional process, of eliminating the liner is lost. It should be noted that the adhesive needs to have high enough modulus to reduce or prevent flow under the pressures it experiences in the roll as the label stock moves through the supply chain and the subsequent dispensing process. For this modulus to be attained, the adhesive needs to be cured (i.e crosslinked). If the adhesive is not cured it will flow under the roll pressure, leading to both contamination on the edges of the labels (due to edge ooze), affecting the aesthetics, as well as issues with unwinding of the roll at high speeds (during dispensing), since this ooze tends to make the roll blocky. This need for higher crosslinking (via curing) necessitates the usage of higher adhesive coat weights to get the required tack and adhesion to the target surfaces, and thereby drives the cost up further.

A further challenge facing this approach is to create individual labels from the label stock (throughout this description, also referred to as "singulation") at the point of dispensing by the end-user. Since there is no liner to carry the pre-die cut labels to the dispensing point, singulation can only occur at the point of dispensing. One approach to this challenge is to utilize a re-usable liner at the dispensing point. This allows a label to be die cut from and the web, singulated, and to subsequently be carried to the dispensing head by the temporary liner. There-usable liner reduces the cost benefit of the solution (since a liner is re-introduced) and adds complexity to the process. Another approach to solving the dispensing problem of a liner-free adhesive system utilizes labels that are 'weakened' within the web prior to dispensing. In this scheme, the surrounds of labels within the web are weakened by slits or perforations. This 'weakening' is typically done on the printing press (and would replace traditional die-cutting) so that the weakened self-wound material can be provided to the end-user in a ready to use state. The line of weakening for each label includes at least one aperture which provides for engagement by a tool, which at the time of dispensing can be utilized to break the weakened area and thus separate the leading label in the web and allow it to be applied to a product. In this scheme, the self-wound web carries the label to the dispensing point but labels are easily removed from the web. Whilst such schemes solve the dispensing challenge, they have seen limited adoption because the limited cost benefit of the total solution does not justify the additional complexity of dispensing.

Activatable Labels involve applying a specialty coating or cover layer to the adhesive system (essentially replacing the liner and the release system) or having an adhesive system which is non-tacky at room temperature. In these solutions a separate process, just prior to labeling, either removes the coating/cover layer to 'unmask' the adhesive or activates the adhesives through an external stimulus such as heat or liquid. Activatable labels are supplied to the end user in a non-tacky state, and then the labels are activated, i.e., the label's adhesive is exposed (activated) to its tacky state just prior to application to the intended product. Obviously activatable labels are printed prior to activation. Well described schemes include the use of ultraviolet ("UV") energy to heat the adhesive, corona treatment to activate the surface, radiant heat to warm the adhesive, moisture to activate a rewettable adhesive, microencapsulating an activator material, which can then be crushed to allow the activator to mix with the rest of the formulation and activate the adhesive, overcoating the adhesive with a de-tackifier layer, which is later removed by heat or mechanical means, and ultrasound energy to activate the adhesive.

By far, the most common activation scheme utilizes heat activation, involving such schemes as the removal of a protective coating or activating of the label adhesive utilizing heat. For heat activating the adhesive, various techniques have been proposed. The adhesive remains tacky for a short time defined as the open time of between 0.2 and 10 seconds within which the adhesive has to be applied to the substrate. In addition, general methods for heating utilizing radio frequency ("RF") energy, inductive heat, radiant heat, and visible light also are well known and could be applied to this list of activation methods. These techniques may have some utility for low-speed operations, but as application speeds increase for high speed labeling, these methods all suffer in that the exposure times of the labels to the heating elements must somehow be increased in order to gain sufficient heating. The size, and the concurrent cost, of the units capable of supplying sufficient heating has thwarted high-speed applications.

While all of the above related art activatable label schemes do indeed eliminate the liner and the release system, and, therefore, a waste stream, they replace them with another, often relatively expensive material, add complexity and again do not meaningfully improve cost. The cost issues arise both from the use of often expensive components in a specialty coating which masks the adhesive or expensive additives/process to create a non-tacky adhesive. Further the requirement for additional process assets to remove the coating or activate the adhesive also adds cost to the overall solution. Finally, singulating the labels at the point of dispensing remains challenging (without a carrier web as described previously). As discussed, related art approaches to singulating at the dispensing point exist but add complexity and the cost of proposed activatable label solutions do not justify end-users engaging in this additional complexity.

Finally, it should be noted that due to the often complex formulations needed to render an activatable adhesive non-tacky the final adhesive after activation is commonly hazy. If the adhesive is hazy then a meaningful part of the label market, the so-called 'clear-on-clear' label, cannot be addressed. For clear-on-clear a clear printed film with a clear adhesive is applied to a product and only the print is evident allowing a consumer to see product beneath the label. If the adhesive is hazy then the appearance is unacceptable.

The labeling process according to embodiments of the present disclosure offers a number of enhancements over related art PSA labeling. First, it eliminates the need for a liner and release system. This has significant cost and environmental benefits. Unlike other approaches, the eliminated materials are not replaced with another material. The usage of a hot melt or warm melt adhesive, e.g., at low coat weights, provides material cost savings whilst offering the desired adhesive performance. A small adhesive coating unit (e.g., for coating on a web including only a single pane of labels, in contrast to coating on a wide web including multiple panes of labels) is included in the labeling system (i.e., the novel coating and dispensing system). The cost of the coating unit will be amortized over many years of running and many thousands of labels and does not materially add to the total cost of the solution. In addition, this coating unit replaces the large coating asset utilized in the traditional PSA labeling process.

The labeling process and system according to embodiments of the present disclosure also offer the ability to dramatically simplify the supply chain. In deployments where the printing is done at a separate site from the end-user, the need for an adhesive coater and a liner manufacturer are eliminated (essentially taking two steps out of the value chain). In deployments where the printing is done fully by the end-user in-line with the dispensing, the printer is removed from the supply chain. These improvements offer efficiency and cost benefits and, additionally, offer the end-user tremendous flexibility in their supply chain and the ability to customize their labels.

Another approach to high speed labeling, but not utilizing a PSA, is a system called "Cut and Stack". This labeling system is primarily for paper labels and involves the following typical steps: first, the paper face stock is printed with labels, typically on a roll-to-roll press. The labels are die cut from the printed face stock and stacked in a magazine. It should be noted that the shapes of labels are typically confined to square or rectangular shapes. Typically this die cutting and stacking occurs at the end of the printing press. The stacked labels are then delivered to an end-user who loads the magazine of labels into a feed system from which individual labels are taken and wiped with a water based glue. The glue wiped labels are then transported to a dispensing point where they are applied to products.

The cut and stack process is commonly utilized in high volume applications and provides an inexpensive form of paper labeling. However the system is only useful for paper labels. For filmic labels, the quality is not sufficient, especially when a clear label appearance is needed, i.e., clear-on-clear applications. Further, it is difficult to effectively dry the water based adhesive with a filmic face stock.

The labeling system according to embodiments of the present disclosure offers a cost-effective alternative to cut and stack, and enables the usage of filmic face stock. Similar to cut and stack, the labeling system according to embodiments of the present disclosure utilizes only a printed face stock and an adhesive. However, the system according embodiments of the present disclosure utilizes a high performance, clear and non-aqueous based adhesive (which requires no drying). Such adhesive is suitable to label both paper and filmic face materials, and provides a much high quality final appearance. The warm/hot melt adhesive also provides water resistance, water whitening resistance and water bath immersion resistance, which is essential for clear labels on bottles submerged in ice chests.

According to an embodiment of the present disclosure, a pressure sensitive adhesive label consists of a face stock; an indicia on the face stock; and a pressure sensitive adhesive on the face stock, wherein the pressure sensitive adhesive has a coat weight of about 3 gsm to about 20 gsm, and a 180° peel of about 1 N/inch to about 20 N/inch.

The following Tables and Examples illustrate the performance of the adhesive on various surfaces.

Example 1

A hot melt adhesive from BASF, acResin® A250 UV was coated onto a release liner utilizing a slot die and UV cured at 0, 15 and 30 $mJ/cm^2$. After curing, it was laminated to either a 1 or 2 mil polyester film in order to test adhesion to glass, HDPE and stainless steel (SS) panels. The adhesive on the 1 or 2 mil PET film was laminated to the respective panel, rolled up and down with a 2 kg rubber roller and allowed to dwell on the panel for various periods of time listed in Table 1. The 180° Peel adhesion was measured utilizing a LabThink XLB(B) Auto Tensile Tester (LabThink Instruments Co. Ltd.) at a speed of 300 mm/min and peel values reported were from an average of 3 to 5 measurements.

Example 2

A sample was prepared substantially similar to the samples of Example 1, except that a Henkel UV curable adhesive UV 5321 was utilized instead of the acResin® A250 UV. The test data is shown in Table 2.

TABLE 1

| Example | Adhesive | Coat weight, gsm | UV Dosage, mJ/cm2 | Film | Glass panel, 180° Peel, N/inch | | | | HDPE panel, 180° Peel, N/inch | | SS panel, 180° Peel, N/inch | |
|---|---|---|---|---|---|---|---|---|---|---|---|---|
| | | | | | 30 min | 24 hr | 7 days | 38 days | 30 min | 19 days | 30 min | 21 days |
| 1.0 | BASF acResin A250 | 10 | 15 | 1 mil PET | 6.1 | 8.8 | 10.6 | | 4.5 | 4.42 | 10 | 10.94 |
| 1.1 | BASF acResin A250 | 10 | 30 | 1 mil PET | 6.3 | 11.6 | 10.4 | | 3.9 | 5.7 | 4.6 | 9 |
| 1.2 | BASF acResin A250/ Foral 85E*, 90/10 | 10 | 30 | 1 mil PET | 7.5 | 9.4 | 11.2 | | 3.1 | 4.1 | 7.6 | 11.1 |
| 1.3 | BASF acResin A250 | 9.8 | 0 | 2 mil PET | 15.7 | | | | | | | |
| 1.4 | BASF acResin A250 | 9.8 | 15 | 2 mil PET | 4 | | | 9.1 | | | | |
| 1.5 | BASF acResin A250 | 9.8 | 30 | 2 mil PET | 10 | | | 15.3 | | | | |
| 1.6 | BASF acResin A250 | 13.6 | 0 | 2 mil PET | 14 | | | | | | | |
| 1.6 | BASF acResin A250 | 13.6 | 15 | 2 mil PET | 13 | | | 17 | | | | |
| 1.7 | BASF acResin A250 | 13.6 | 30 | 2 mil PET | 9.6 | | | 15.9 | | | | |

Foral 85E* is from Eastman and is utilized as a tackfier.

TABLE 2

| Example | Adhesive | Adhesive Thickness, mil | UV dosage, mJ/cm2 | Glass, 180° Peel, N/inch | | |
|---|---|---|---|---|---|---|
| | | | | 30 min | 24 hours | 30 days |
| 2.1 | Henkel UV 5321 | 0.65 | 0 | 9.5 | 11.5 | 9.8 |
| 2.2 | Henkel UV 5321 | 0.65 | 6 | 2.8 | 8.54 | 8.2 |

A truly linerless labeling process and system which eliminate both the liner and the release system have been described. The labeling process applies the pressure sensitive adhesive in-line with the dispensing of the labels. Further, the printing of the label graphics, in whole or in part, may be performed on the label stock in-line with the dispensing. A hot melt or warm melt adhesive or UV curable syrup (or other suitable energy-activated adhesive) is coated to a label face stock, and optionally rapidly cured before dispensing singulated labels onto the products (such as bottles or containers) in a single continuous process to achieve a low cost waste free system. The system eliminates both the liner and the release system, and offers significant supply chain benefits (as labels are created at point of use). The inventions described herein offer meaningful reductions in the amount of adhesive required (reducing the adhesive in some cases by more then 50%). Further the inventions allow also for meaningful reductions in the thickness of the face material. In addition, each material layer utilized in the label manufacturing and application process remain on the finally applied label, and no additional layers, which requires removal upon dispensing of the label (such as the liner and/or the release system), are ever present in the label and the process of manufacturing or application of the label. Taken altogether the invention results in a dramatic reduction on overall material usage and the consequent environmental footprint of PSA labeling.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

The invention claimed is:

1. A method of labeling a plurality of products, the method comprising:
coating a pressure sensitive adhesive to a roll of face stock, the pressure-sensitive adhesive being a warm melt or a hot melt pressure-sensitive adhesive;
singulating an individual label from the roll of face stock, the individual label singulated using at least a perforated line or a weakened line;
applying the individual label to a product of the plurality of products;
wherein (a) the coating, singulating and applying are conducted sequentially in a single continuous operation on the roll of face stock, and (b) a release layer and a liner are not used in the method.

2. The method of claim 1, further comprising printing an indicia on the face stock.

3. The method of claim 1, wherein the printing is conducted prior to the coating of the pressure sensitive adhesive at a same site as a site for the coating of the pressure sensitive adhesive.

4. The method of claim 1, wherein a total time needed from unwinding a section of the face stock from the roll of face stock corresponding to an individual label to a completion of the applying of the individual label is about 60 seconds or less.

5. The method of claim 1, wherein the coating is conducted at a temperature of about 60° C. to about 170° C.

6. The method of claim 1, wherein the applying of the individual label is about 10 seconds or less after the coating of the pressure sensitive adhesive.

7. The method of claim 1, wherein the roll of face stock comprises a pre-printed face stock.

8. The method of claim 1, wherein the pressure-sensitive adhesive is an acrylic pressure sensitive adhesive comprising tackifier.

9. The method of claim 1, wherein the pressure-sensitive adhesive is selected from a group consisting of acrylic polymers, polyurethanes, silicone polymers, copolymers of styrene and butadiene, styrene and isoprene, styrene and ethylene butylene and combinations thereof, with and without additives.

10. The method of claim 1, wherein coating the pressure sensitive adhesive to the roll of face stock comprises coating on the face stock in a shape of strips with each strip spaced apart from neighboring strips.

11. The method of claim 1, wherein coating the pressure sensitive adhesive to the roll of face stock comprises using die coating, screen coating, printing or spray coating.

12. The method of claim 1, further comprising multiple lanes of labels.

13. The method of claim 12, wherein each lane of labels is singulated by a different tool and the labels therefrom are applied to different lines of products.

14. A system for labeling a plurality of products, comprising:
a coating station to coat a pressure sensitive adhesive to a roll of face stock, the coated roll of face stock not including a release layer and a liner, the pressure-sensitive adhesive being a warm melt or a hot melt pressure-sensitive adhesive;
a singulating station to singulate an individual label from the roll of face stock, the individual label singulated using at least a perforated line or a weakened line; and
a dispensing station to apply the individual label to a product of the plurality of products;
wherein the coating station, the singulating station and dispensing station are located at a same site to provide sequential coating of the pressure sensitive adhesive, singulating of the individual label and applying of the individual label.

15. The system of claim 14, further comprising a transportation station to move the face stock from an unwinding station to the coating station, the singulating station and the dispensing station sequentially.

16. The system of claim 15, wherein the transportation station comprises at least a belt.

17. The system of claim 14, further comprising an accumulation station between the coating station and the singulating station to accumulate the face stock when a speed of the face stock at the coating station is faster than a speed of the face stock at the singulating station.

18. The system of claim 14, further comprising a printing station to print an indicia on the face stock.

19. The system of claim 14, wherein the roll of face stock comprises a pre-printed face stock.

20. The system of claim 14, wherein the pressure-sensitive adhesive is an acrylic pressure sensitive adhesive comprising tackifier.

21. The system of claim 14, wherein the pressure-sensitive adhesive is selected from a group consisting of acrylic polymers, polyurethanes, silicone polymers, copolymers of styrene and butadiene, styrene and isoprene, styrene and ethylene butylene and combinations thereof, with and without additives.

22. The system of claim 14, wherein the coating station coats the pressure sensitive adhesive on the face stock in a shape of strips with each strip spaced apart from neighboring strips.

23. The system of claim 14, wherein the plurality of individual labels are aligned in multiple lanes, each lane of labels is singulated by at least one tool selected from the multiple tools and the labels therefrom are applied to different lines of products.

* * * * *